(12) United States Patent
Takahashi et al.

(10) Patent No.: US 7,574,270 B2
(45) Date of Patent: Aug. 11, 2009

(54) TERMINAL CONTROL METHOD, TERMINAL APPARATUS AND PROGRAM

(75) Inventors: Hidehiko Takahashi, Kanagawa (JP); Atsushi Imai, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 249 days.

(21) Appl. No.: 11/458,875

(22) Filed: Jul. 20, 2006

(65) Prior Publication Data

US 2007/0061448 A1  Mar. 15, 2007

(30) Foreign Application Priority Data

Aug. 12, 2005 (JP) ............................ 2005-234489

(51) Int. Cl.
*B29C 45/00* (2006.01)
*G06F 19/00* (2006.01)
*G05B 11/01* (2006.01)
*H04M 1/725* (2006.01)

(52) U.S. Cl. ............... 700/19; 379/201.05; 379/207.02; 379/207.03; 379/207.12; 455/412.1

(58) Field of Classification Search .............. 455/412.1, 455/414.2, 456.3, 550.1; 379/201.05, 207.02, 379/207.03, 207.12, 207.16; 700/19
See application file for complete search history.

(56) References Cited

U.S. PATENT DOCUMENTS

| 6,753,842 | B1 | 6/2004 | Williams et al. | |
|---|---|---|---|---|
| 7,096,030 | B2* | 8/2006 | Huomo | 455/456.3 |
| 2004/0097244 | A1* | 5/2004 | Yamazaki et al. | 455/456.3 |
| 2005/0060532 | A1* | 3/2005 | Dorenbosch et al. | 713/100 |
| 2006/0027656 | A1* | 2/2006 | Aoike | 235/451 |
| 2007/0037605 | A1* | 2/2007 | Logan | 455/567 |

FOREIGN PATENT DOCUMENTS

JP    2004-312619    11/2004

* cited by examiner

*Primary Examiner*—Ronald D Hartman, Jr.
(74) *Attorney, Agent, or Firm*—Oblon, Spivak, McClelland, Maier & Neustadt, P.C.

(57) ABSTRACT

A terminal control method includes device processing executed by using a device that a terminal includes, an application program installed on the terminal, a service definition file for storing user setting required when the application program is executed and a broker for judging the device processing, judging whether or not an item corresponding to user setting condition defined by the service definition file is executed by the device processing and executing processing defined to the application program if the corresponding item is executed by the device processing.

7 Claims, 10 Drawing Sheets

TERMINAL CONTROL METHOD, TERMINAL APPARATUS AND PROGRAM

CROSS REFERENCES TO RELATED APPLICATIONS

The present invention contains subject matter related to Japanese Patent Application JP 2005-234489 filed in the Japanese Patent Office on Aug. 12, 2005, the entire contents of which being incorporated herein by reference.

BACKGROUND OF THE INVENTION

1. Field of the Invention

The present invention relates to a terminal control method suitable for use as the application to an information processing terminal such as a mobile phone terminal, a terminal apparatus to which such control is applied and a program for executing such control.

2. Description of the Related Art

Some information processing terminal such as a mobile phone terminal is able to automatically carry out setting of the terminal at timing designated by a user. For example, a simple example of such control is such one that a timer can automatically start to operate at time designated by the user to generate ringer tones from the mobile phone terminal.

Functions operable by the user setting may be realized by application program inserted beforehand into the mobile phone terminal.

Cited Patent Reference 1 discloses an example of a mobile phone terminal in which various functions can be realized by user setting.

[Cited Patent Reference 1]: Japanese Published Patent Application No. 2004-312619

SUMMARY OF THE INVENTION

In the functions which can be fulfilled automatically based on the above-mentioned user setting, arrival of time is judged by using a threshold value previously set within the mobile phone terminal. Therefore, items that can be set were limited and it was difficult to add new functions to the mobile phone terminal later on. Specifically, in the case of the example of the mobile phone terminal in which a timer automatically starts to operate at time designated by a user, for example, it is not possible to change the action of "ringer tones are generated at designated time" to other conditions than the condition of "at designated time". Also, in order to add a plurality of conditions to the mobile phone terminal, it becomes necessary to modify the setting application within the mobile phone terminal. However, such modification is generally difficult to make.

In the terminal apparatus such as the mobile phone terminal apparatus, it has been customary that a user is allowed to select a value that can be set in predetermined setting items. For this reason, some conditions may not be set to applications added by downloading or the setting items may not be transmitted to the downloaded application. For example, it was difficult to execute addition or modification such as to add the setting item later on so that a play file may be transmitted to a music play application to transmit information in response to ON/OFF of a manner mode when a play message is transmitted to the music play application.

In view of the aforesaid aspect, the present invention intends to a terminal control method, a terminal apparatus and a program in which functions of a terminal can be added efficiently.

According to an aspect of the present invention, there is provided a terminal control method which includes device processing being executed by using a device that a terminal includes, an application program installed on a terminal, a service definition file for storing user setting required when the application program is executed and a broker for judging the device processing. The broker judges whether or not an item corresponding to user setting condition defined by the service definition file is executed by the device processing and executes processing defined to the application program if the corresponding item is executed.

According to the above-mentioned arrangement, when an interrupt is generated from the application program which executes the device processing, the broker, for example, judges whether or not such generated interrupt applies to an item corresponding to a user setting condition defined by the service definition file. If the interrupt applies to the item corresponding to the user setting condition, then the defined application is executed.

DESCRIPTION OF THE PREFERRED EMBODIMENTS

The present invention will now be described below with reference to the drawings FIG. 1 of the accompanying drawings is a block diagram showing an example of an arrangement of a mobile phone terminal apparatus for executing processing according to an embodiment of the present invention. The arrangement of this mobile phone terminal apparatus according to the embodiment of the present invention will be described with reference to FIG. 1.

Figure 1:
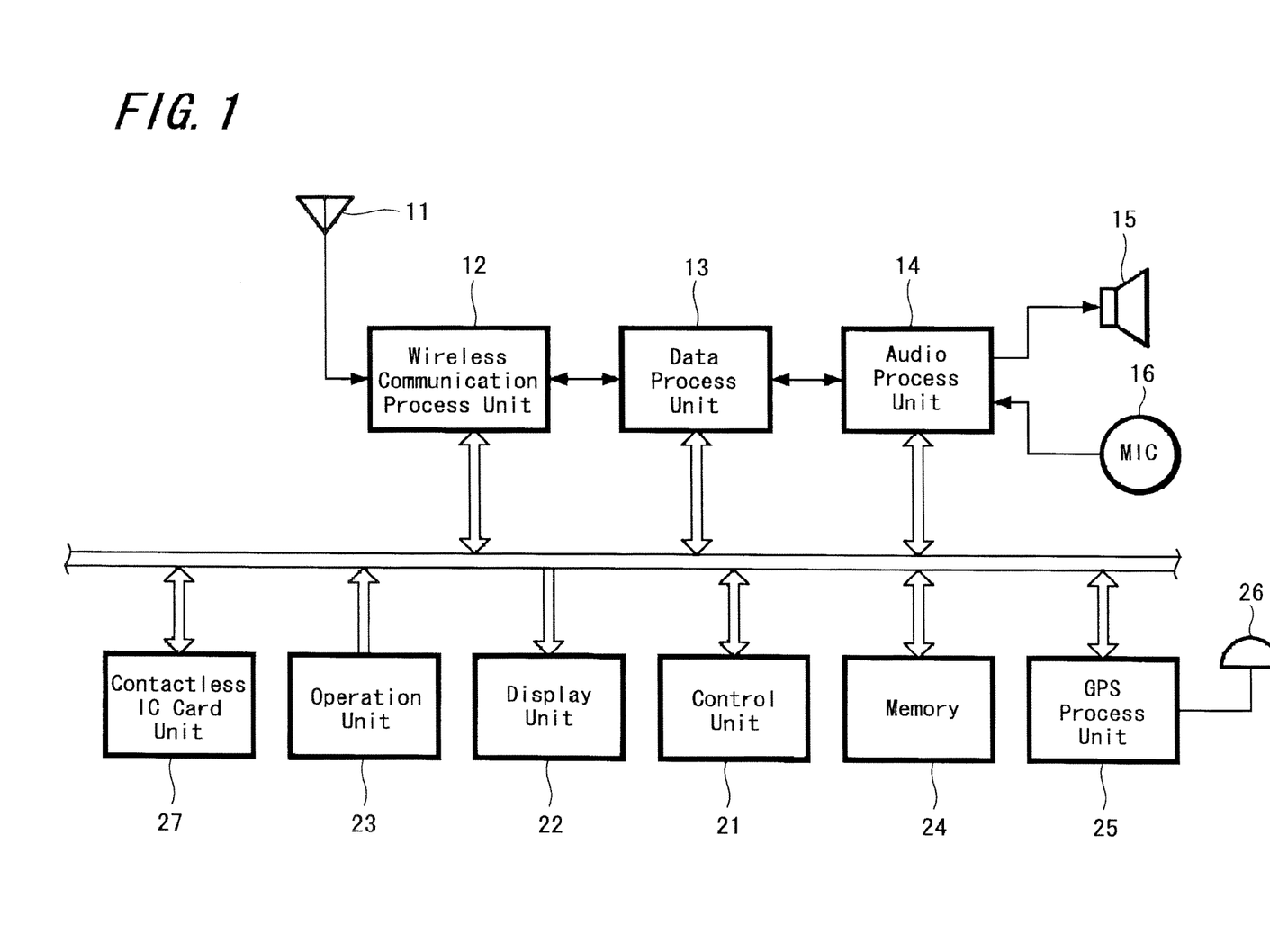
FIG. 1 is a block diagram showing an example of a terminal according to an embodiment of the present invention.

As shown in FIG. 1, an antenna 11 is connected to a wireless communication processing unit 12 and the wireless communication processing unit 12 carries out wireless transmission and wireless reception between it and a base station (not shown) and the like. A signal received at the antenna 11 is supplied through the wireless communication processing unit 12 to a data processing unit 13, in which necessary data is extracted from the received signal. When audio data is received at the antenna 11, received audio data is supplied through the data processing unit 13 to an audio processing unit 14, in which audio data is processed to provide an audio signal. The thus processed audio signal is supplied from the audio processing unit 14 to a speaker 16 from which the processed audio signal is outputted as sounds. Also, an audio signal picked up by the microphone 16 is supplied to the audio processing unit 14, in which the supplied audio signal is processed as transmission audio data. The thus processed audio data is supplied to the data processing unit 13 and thereby processed as data having a transmission data arrangement. Transmission data generated from the data processing unit 13 is supplied to the wireless communication processing unit 12, in which it is processed in a wireless transmission processing fashion and the thus processed transmission data is transmitted from the antenna 11 to the outside in a wireless fashion.

When this mobile phone terminal apparatus accesses the Internet or carries out data transmission and reception such as transmission and reception of e-mail data and the like, data received by the data processing unit 13 is supplied to the side of a control unit 21 and thereby accumulated in a memory 24. Transmission data is supplied from the memory 24 to the data processing unit 13 and thereby processed for transmission. A memory 22 is adapted to execute corresponding display based on e-mail data and data to read browsers. Also, this mobile phone terminal apparatus includes an operation unit 23 composed of operation keys operable by users and the like. The control unit 21 judges the operation state and sets operation modes corresponding to operations and operation modes.

The mobile phone terminal apparatus according to this embodiment includes a GPS (Global Positioning System) processing unit 23. This GPS processing unit 23 is able to measure the current position of the terminal device based on a signal received at a GPS antenna 26 from a measurement satellite. Measured position information is judged at the side of the control unit 21.

Further, the mobile phone terminal apparatus according to this embodiment includes a contactless IC card unit 27 to carry out personal identifier and accounting by executing wireless communication for authentication between a reader and a writer which are located close to each other. The control unit 21 is able to display authenticated state and the like while monitoring the processed state at this contactless IC card unit 27.

Figure 2:
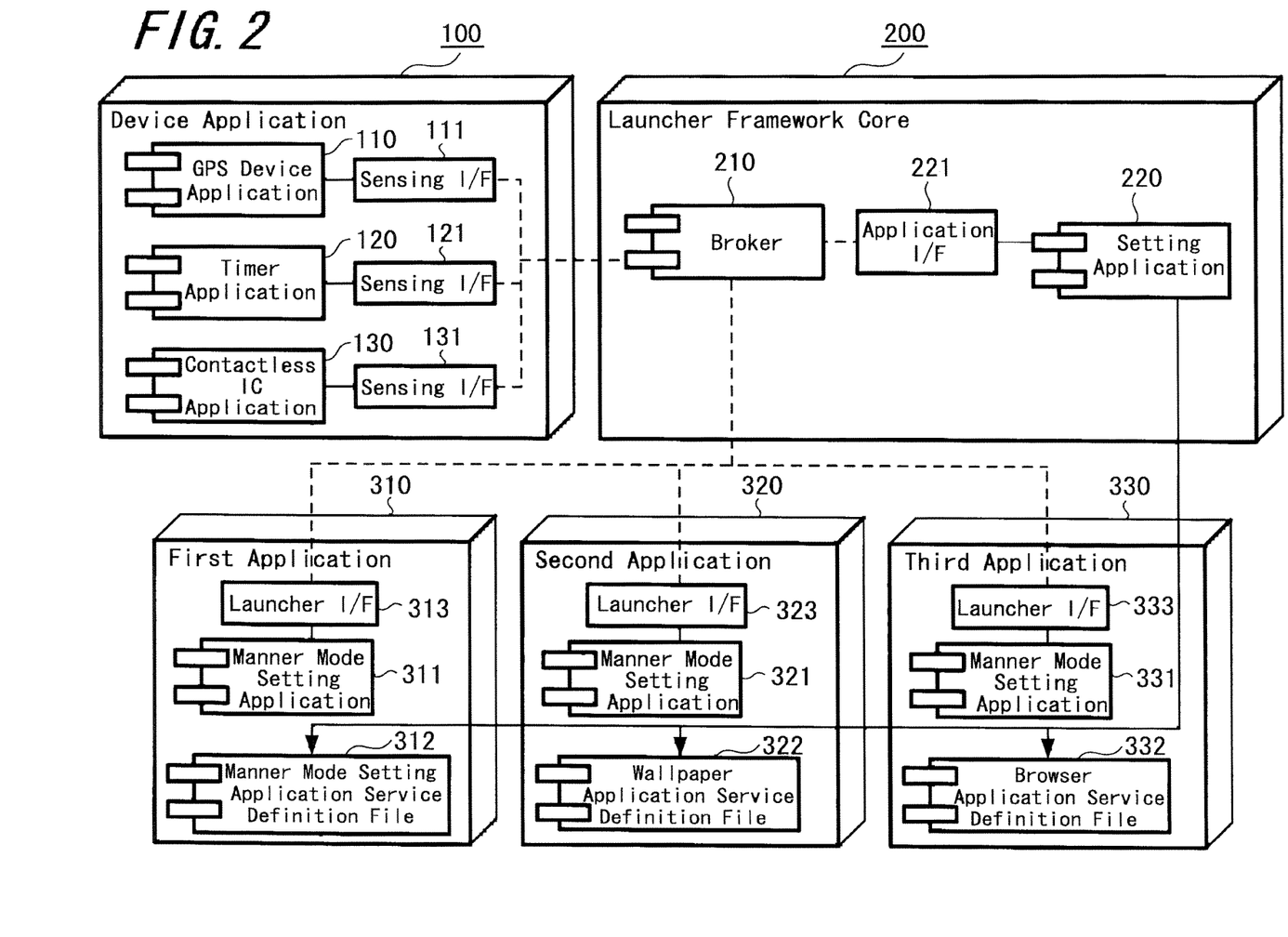
FIG. 2 is a diagram showing an arrangement of an example of a launcher framework component according to an embodiment of the present invention.

Next, an arrangement by which software to operate respective functions prepared in the mobile phone terminal apparatus according to this embodiment is executed will be described with reference to FIG. 2. FIG. 2 is a diagram showing an arrangement of a launcher framework component according to the embodiment of the present invention. This launcher framework component is a component constructed when the program stored in the memory 24 shown in FIG. 1 is executed by the control unit 21. In FIG. 2, a device that may execute respective functions of the mobile phone terminal apparatus is shown as a device application 100. The mobile phone terminal apparatus includes a GPS device application 110, a timer application 120 and a contactless IC card application 130 as the device application 100. The respective applications 110, 120 and 130 are connected to a broker 210 of a launcher framework core 200 through sensing interfaces 111, 121 and 131.

In the launcher framework core 200, the broker 210 may communicate with a setting application 220 through an application interface 221. The broker 210 controls execution of application programs set to this mobile phone terminal apparatus. The broker 210 includes a first application 310, a second application 320 and a third application 330 as applications.

The first application 310 is equipped with a manner mode setting application 311 and it includes a manner mode setting application service definition file 312. The second application 320 is equipped with a wallpaper application 321 and it includes a wallpaper application service definition file 323. The third application 330 is equipped with a browser application 331 and it includes a browser application service definition file 332. The respective applications 311, 321 and 331 are connected through launcher interfaces 313, 323 and 333 to the broker 210. In the case of this embodiment, when receiving serialized format data, the launcher interfaces 313, 323 and 333 convert the serialized format data into original format data and supply the thus converted original format data to the application program.

The respective setting applications 311, 321 and 331 read the service definition files 312, 322 and 332 of the respective applications and allow the user to select a device and the kind of action if the operation condition of the selected device is satisfied.

The broker 210 checks if there is an item which applies to the condition set by the user each time an interrupt is generated from the device application. If there is the item which applies to the condition set by the user, then the thus set application is called and a defined message is informed of the user.

For example, let us consider the example in which a GPS device application is connected to the manner mode setting application if the user sets the mobile phone terminal apparatus to the manner mode when the user arrives at the station. A GPS device application 110 is connected to the device application 100 as the sensor and the manner mode setting application is connected to the application. A service definition file of the manner mode setting application has the following items.

(Service)<
  <Name> manner mode setting </name>
  <Parameter type="ON/OFF" name="Switch"/>
  <Activation type type="HOGEHOGE"/>
  </service>

In this embodiment, one service called "manner mode setting" is defined as the service and this is the item of the type that can select ON/OFF as parameters.

The manner mode setting application is called from the broker through the launcher I/F. The launcher I/F can acquire a value designated by the user in accordance with the service definition file. Since the manner mode ON/OFF is designated as described above, property of "Switch" is acquired. When the manner mode ON is designated, the manner mode is set to ON and the event is finished. The above-mentioned service definition file is adapted to describe files that the application program is able to activate and set. This service definition file will be described below. The service definition file according to the embodiment of the present invention is an independent file and it is described by a general-purpose language. Therefore, this service definition file is compliant with not only built-in applications but also additional downloaded applications. The service definition file is read from the launcher setting application and it can give the user choices.

As the structure of the service definition file, there is known the following file that is described by a general-purpose meta-description language.

<Service>
<Name> Manner mode setting <Name>
<Parameter type="ON/OFF" name="Switch"/>
<Activation type type="HOGEHOGE"/>

The name and the parameter are designated for one service and HOGEHOGE is set to the activation type that can be selected.

Parameters express items which are entered by the user. Types of input are expressed by [type]. Types are classified as primitive types which are prepared in advance and original types which are defined at every device. The original types can be set through the device application and they can be transmitted at the same time messages are transmitted to the application in response to the event. In the case of this embodiment, one application is able to provide a plurality of services and it is able to designate a plurality of parameters.

Parameters delivered to the application are classified as two kinds of primitive type parameters and original type parameters. Primitive type parameters are parameters built-in the launcher. For example, there are prepared primitive type parameters such as ON/OFF, text, numeric value, URL, file selection, list and time. In the case of ON/OFF, the input box serves as ON/OFF item and the user may select either ON or OFF. In the case of text, the mobile phone terminal apparatus is set to the text input mode by which the user becomes able to set the text.

Original parameters are complex type parameters other than the parameters inputted by the user and those that can designate device-dependent parameters. For example, original parameters are able to express the current position obtained from the GPS and binary data inputted from the contactless IC card application and the like. When these parameters are serialized by device applications in a binary fashion and deserialized by handled applications, data can be received and transmitted.

Original parameters are able to call device applications so that the user can set the thus called device applications. Also, original parameters are able to acquire values from device applications when an event occurs. In the case of the GPS, when an event is set, original parameters can allow the user to select the position from a map. Also, original parameters can allow the user to transmit the current position when an event occurs.

When an event occurs, the broker calls a type name and a mapped device application and acquires a value. For example, when a type of "LAST_GPS_LOCATION" is designated, the broker calls the mapped GPS application and returns latest acquired position information.

Data is serialized in a binary fashion through the sensing interfaces 111, 121 and 131 (FIG. 2) and transmitted to the application together with the event.

Since original type parameters are binary parameters unlike primitive type parameters, they are deserialized based on specifications of respective device applications or applications and used by respective applications.

When an application is installed on the terminal, the service definition file is deployed. Although the application can operate independently, it becomes possible to activate and call the deployed service from the launcher core framework.

The setting application 220 (FIG. 2) is a component to display the service definition file graphically, which may become an interface with users. That is, a portion which becomes a user interface of a launcher core is the setting application. The setting application executes processing to graphically display the service definition file. When the setting application is activated, a screen like the setting screen shown in FIG. 3, for example, is displayed on the display portion 22 of the terminal device.

Figure 3:
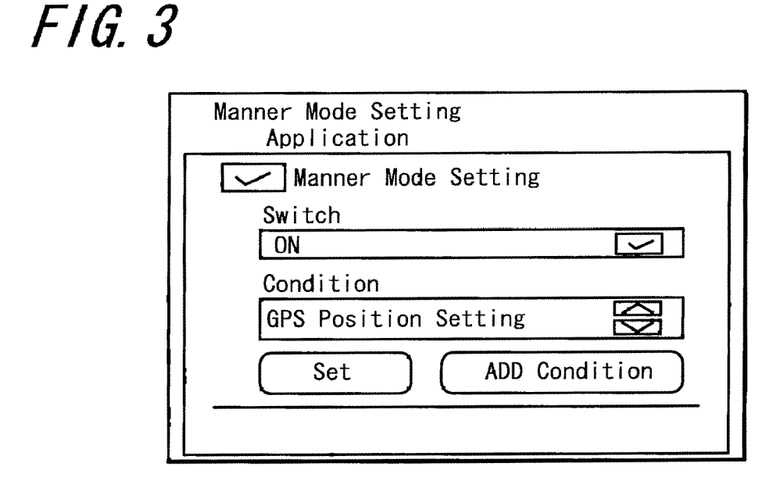
FIG. 3 is an explanatory diagram showing an example of a setting screen according to an embodiment of the present invention.

For example, when the primitive type parameter of ON/OFF is designated in the service definition file, the setting application displays a list box to select ON/OFF on the display portion 22 of the terminal device. In the case of the primitive type parameter to input time, time is displayed on the display portion 22 of the terminal device and it can be selected by user operation.

The setting application 220 receives a plurality of event settings from the user and retains an event list. The thus set event can be edited or deleted. The broker 210 and the setting application 220 are independent and the broker 210 is a resident broker. When an event occurs, the broker 210 reads the setting item from the setting application 220.

Figure 4:
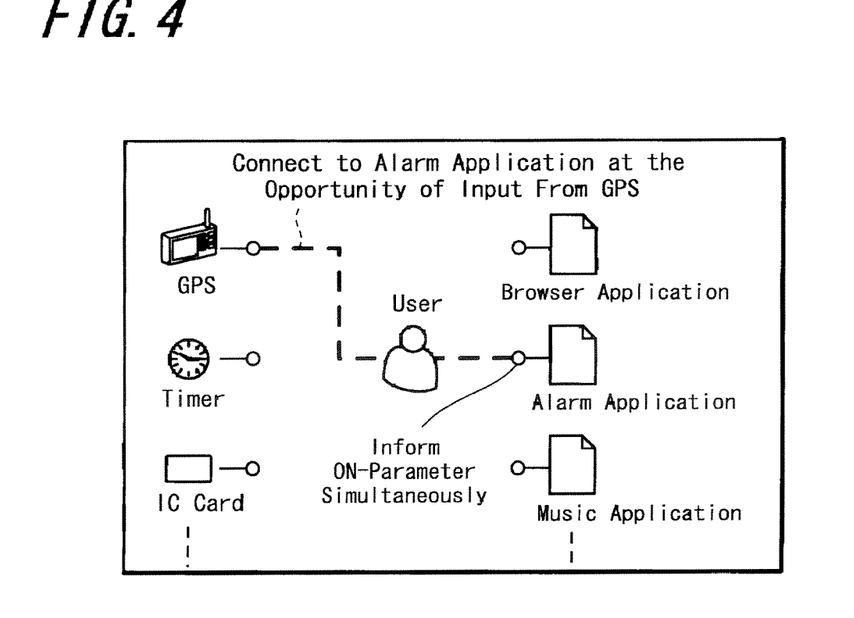
FIG. 4 is an explanatory diagram showing an example of a condition connection according to an embodiment of the present invention.

In the example shown in FIG. 3, the item that can be set by the manner mode setting application is the manner mode setting and the optional item is ON/OFF. When the user depresses a condition button, the user can select a sensing device so that the terminal device may be connected to the connected GPS device application 110. FIG. 4 is an explanatory diagram showing a condition connection obtained at that time. As shown in FIG. 4, at the opportunity of receiving input from the GPS device application 110, the terminal device is connected to the alarm application and the ON parameter is simultaneously transmitted to the user from the alarm application.

When the user depresses the setting button, control moves to the GPS application so that the terminal device is set to the place setting mode. When the setting of the place is completed, the setting of the manner mode is completed. A plurality of conditions can be added. For example, when the user sets "afternoon" in the setting of the timer application and "home" in the setting of the GPS application, the user is able to set the condition that the user returned home in the afternoon.

As described above, the user has set the event to turn on the manner mode switch when the user is approaching the set place to the manner mode setting application. When the setting application is activated, the user can change, add and delete these settings.

Figure 5:
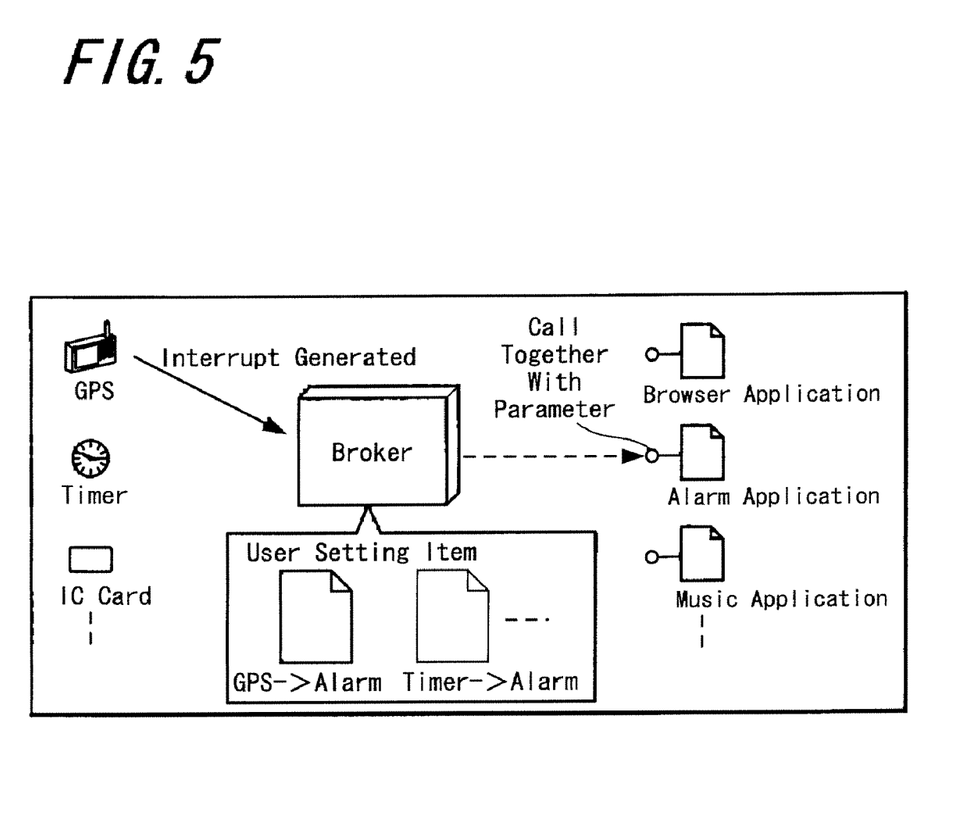
FIG. 5 is an explanatory diagram showing an example of processing executed by a broker according to an embodiment of the present invention.

The broker 210 is the core component to execute matching between an event inputted from the sensor and an event group to thereby handle the event. The behavior of the broker 210 becomes the framework of the launcher core. FIG. 5 is an explanatory diagram showing an example of processing executed by the broker 210. As shown in FIG. 5, when an interrupt is generated from the GPS application, for example, the broker 210 refers to the user setting items from the service definition file and reads a corresponding application program together with parameters.

A broker according to the embodiment of the present invention is a component which connects devices and which executes handling of events. This component is a resident component which executes matching between the event from the device and the item set by the user from the database of the setting application to generate an event designated by the user. Although the broker checks whether or not the event from the device is matched with the setting item designated by the user, it is determined by each device application through the sensing interfaces whether or not the event from the device is matched with the setting item designated by the user.

Figure 6:
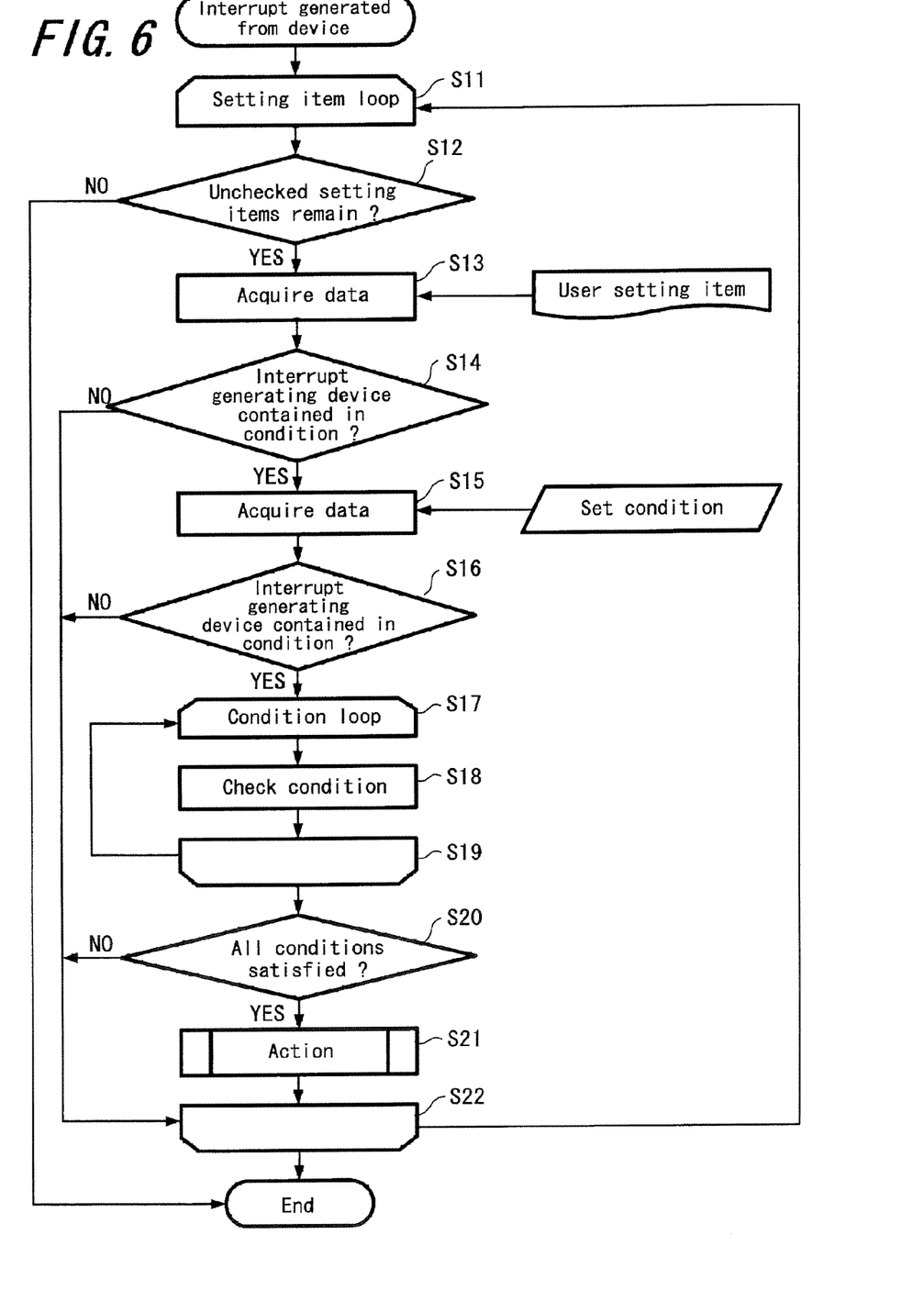
FIG. 6 is a flowchart to which reference will be made in explaining an example of operations of a broker according to an embodiment of the present invention.

The broker is operated as shown in a flowchart of FIG. 6. An example of operations of the broker will be described with reference to FIG. 6. The broker is resident in the standby mode. As shown in FIG. 6, the broker starts to operate when an interrupt is generated from each sensing device. Control goes to a step S1, whereat when the broker receives an interrupt from the sensing device, the broker enters a setting item loop. Control goes the next decision step S12, whereat the broker extracts setting items corresponding to an interrupt source sensing device and determines whether or not there is any setting item which is not yet checked. If there is a setting item which is not yet checked as represented by a YES at the decision step S12, then control goes to the next step S13, whereat the broker acquires data of the user setting item. Control goes to the next decision step S14, whereat it is determined whether or not an interrupt generating device is contained in the condition. If the interrupt generating device is contained in the condition as represented by a YES at the decision step S14, then control goes to a step S15, whereat the broker obtains setting condition. Control goes to the next decision step S16, whereat it is further determined whether or not the interrupt generating device is contained in the condition. If the interrupt generating device is contained in the condition as represented by a YES at the decision step S16, control goes to steps S17, S18 and S19, whereat condition check loop processing is executed. Control goes to the next decision step S20, whereat it is determined whether or not all conditions are satisfied. If all conditions are satisfied as represented by a YES at the decision step S20, then control goes to a step S21, whereat a corresponding action is executed. Then, control goes to a step S22, whereat the above-mentioned processing is repeated until the item setting loop is ended.

The operation shown in the flowchart of FIG. 6 is the processing to determine whether or not the events may be generated for the respective extracted setting items. However, it is determined not by the broker but by the device application corresponding to the sensing device whether or not the events may be generated for the respective extracted setting items. When the device application executes true judgment, the broker transmits a corresponding application message to the device application.

At that time, when the application is not yet activated, the broker tries to activate the application. When the application was already activated, the broker transmits a message. The message may be by a parameter group defined in the service definition file in the form of a general-purpose format such as XML (eXtensible Markup Language).

For example, when an interrupt is generated from the GPS device application, if position information is obtained, then the GPS device application posts position information to the broker. The broker searches an event corresponding to the GPS device application and transmits a message to determine the existence of an event corresponding to the current position information to the GPS device application. If the event falls within the set range, then a corresponding application, in this case, a manner mode setting application is invoked. When the corresponding application is not activated, the application is activated and the broker transmits a message.

Also, device applications for operating respective devices are special applications having the sensing interfaces (I/Fs) mounted thereon as shown in FIG. 2.

Interrupt notice to the broker will be described. A device application is a component connected to a device driver. When the device application receives an interrupt from the device driver, the device application may communicate with the broker so as to let the broker know that the interrupt is generated from the device driver.

Figure 7:
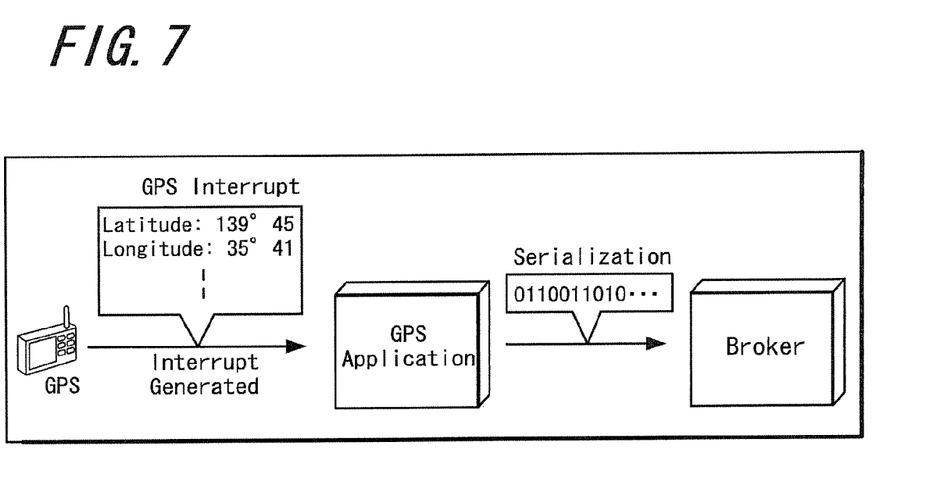
FIG. 7 is a block diagram showing examples of interrupt notification and serialization according to an embodiment of the present invention.

In this embodiment of the present invention, in order to make the broker become unaware of an interrupt notice of every device, the device application may transmit all interrupt notices to the broker in the serialized format. According to this arrangement, even when the device is increased, the broker need not be modified. More specifically, as shown in FIG. 7, if the interrupt is generated in the GPS device application from the GPS processing unit 25 (FIG. 1), then the GPS application transmits data indicative of the interrupt notice to the broker as serialized data. Each device application includes the sensing interface as shown in FIG. 2 and it is installed on the terminal in response to a request from the broker.

Figure 8:
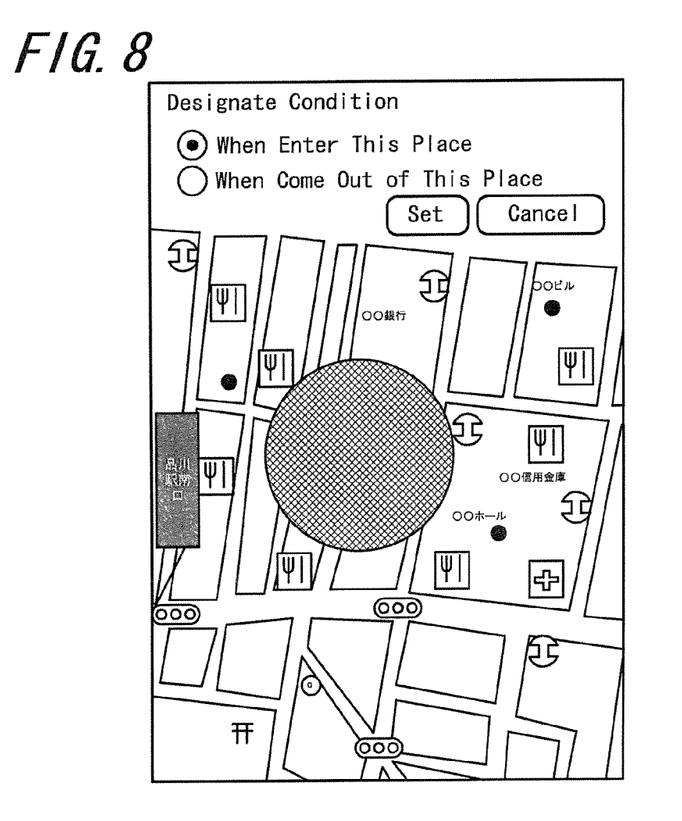
FIG. 8 is an explanatory diagram showing an example of condition setting according to an embodiment of the present invention.

Condition setting on the device side is complex. For example, in the timer condition setting, time may be set (to set ○○ hours △△ minutes □□ seconds) and a.m. and p.m. may be set. Also, when the position is set by the using the GPS, as shown in FIG. 8, for example, a map is displayed on the display of the terminal and the position and the scope (scope is displayed by a half-tone dot meshing circle in FIG. 8) can be displayed and set in the map. In the example shown in FIG. 8, when the user enters the displayed scope, the terminal can be activated. Alternatively, when the user comes out of the scope, the terminal can be activated. It is possible to set the scope and the place by designating the latitude and the longitude.

Figure 9:
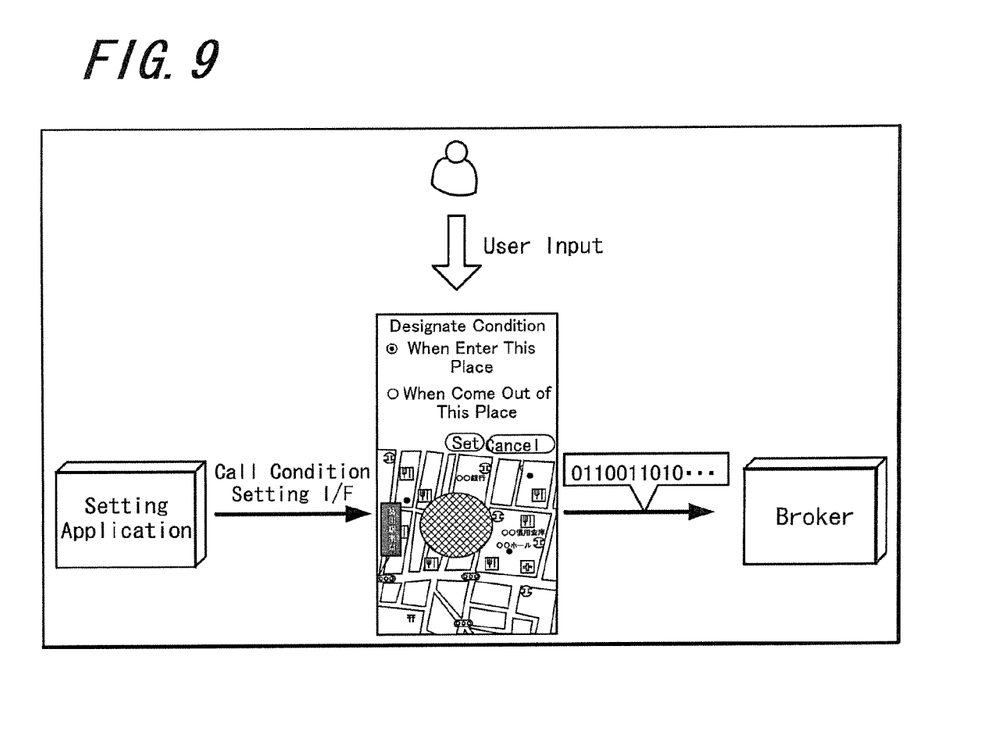
FIG. 9 is an explanatory diagram showing an example of how to enter user conditions according to an embodiment of the present invention.

In the case of this embodiment, in order that the broker may not be modified each time the number of the device is increased, the terminal includes the condition setting interface to execute condition setting at every device. That is, as shown in FIG. 9, when the condition setting interface is invoked from the setting application, a screen to urge the user to enter the user condition is displayed on the display of the terminal and the user may set the condition based on the displayed screen.

When the condition is set, the broker serializes the condition and answers to the setting application. Complex setting of every device is converted into one binary file by serialization. As a result, the broker and the setting application need not become aware of the condition of every device and they become able to cope with any added applications.

Figure 10:
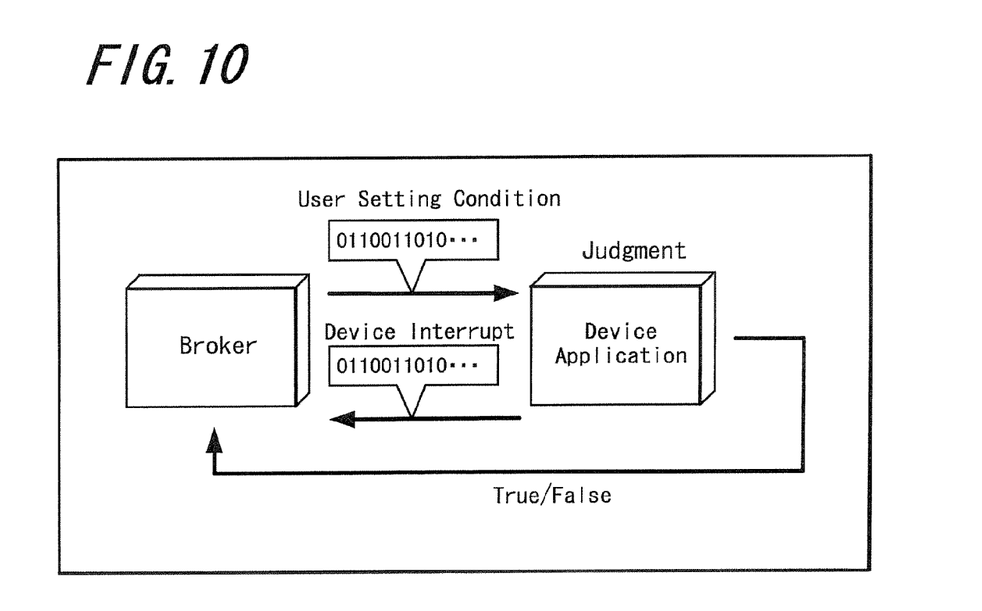
FIG. 10 is an explanatory diagram showing an example of a condition decision interface according to an embodiment of the present invention.

A condition judgment interface equivalent to the condition check loops in the flowcharts of FIG. 6 is adapted to judge whether or not the device is matched with the set condition. In this judgment, when the broker discovers the device which is matched with the condition, such device is invoked. A serialized format of the set condition and a serialized format of the interrupt from the device are supplied to the condition judgment interface and the condition judgment interface judges whether or not they are matched with the condition. FIG. 10 is an explanatory diagram showing an example of processing executed by the condition judgment interface. When device interrupt data and user setting condition data are supplied to the device application, they are judged by the condition judgment interface.

Then, the application program (any one of the application programs 311, 321 and 331) to which the event is noticed through the launcher interface (FIG. 2) are supplied with primitive type parameters and original type parameters of serialized format. The launcher interface converts data of the serialized format into data of the original format and supplies the thus converted data to the application program. To this end, the launcher interface includes a deserializer interface and restores data of the serialized format to provide messages of respective device applications.

Figure 11:
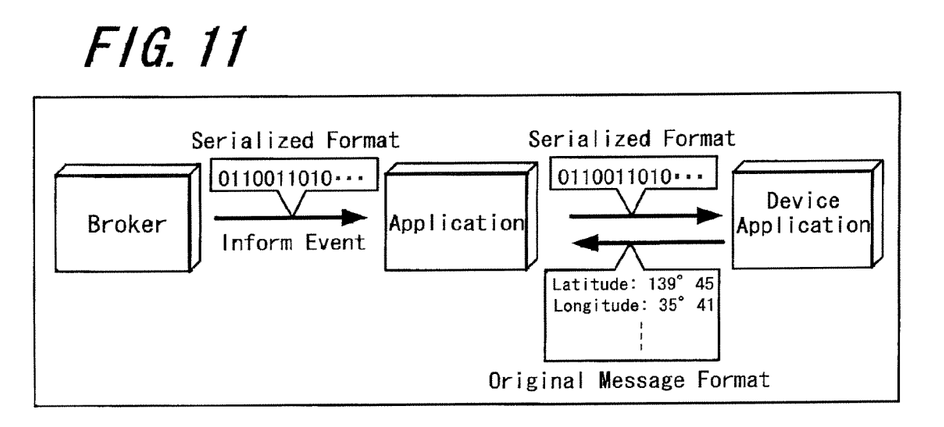
FIG. 11 is an explanatory diagram showing an example of a deserializer interface according to an embodiment of the present invention.

The launcher interface is an interface to receive a generated event. When the broker detects an event, it issues a message envelope through the launcher interface to the application. The application which received the event receives a parameter based on the service definition file. Parameters may be either primitive type parameters or original type parameters. When the parameter is the original type parameter, the application designates the name of the parameter and receives the parameter. When the parameter is the primitive type parameter, the application converts the received binary file from the serialized format into the original message format (for example, longitude xxx degrees and xxx minutes and latitude xxx degrees and xxx minutes, etc.) by using the deserializer interface of the device application and extracts data. FIG. 11 is an explanatory diagram showing an example of such deserializer interface used in that case.

When the application is not activated at the stage in which the event is generated, the application is activated. In that case, the activation type is received by the launcher and the broker issues the message envelope through the launcher interface to the application.

When the application is being operated at the stage in which the event is generated, the broker issues the message to the application. Since the message parameter is accompanied with the message envelope, the application extracts various parameters from this message envelope.

Figure 13:
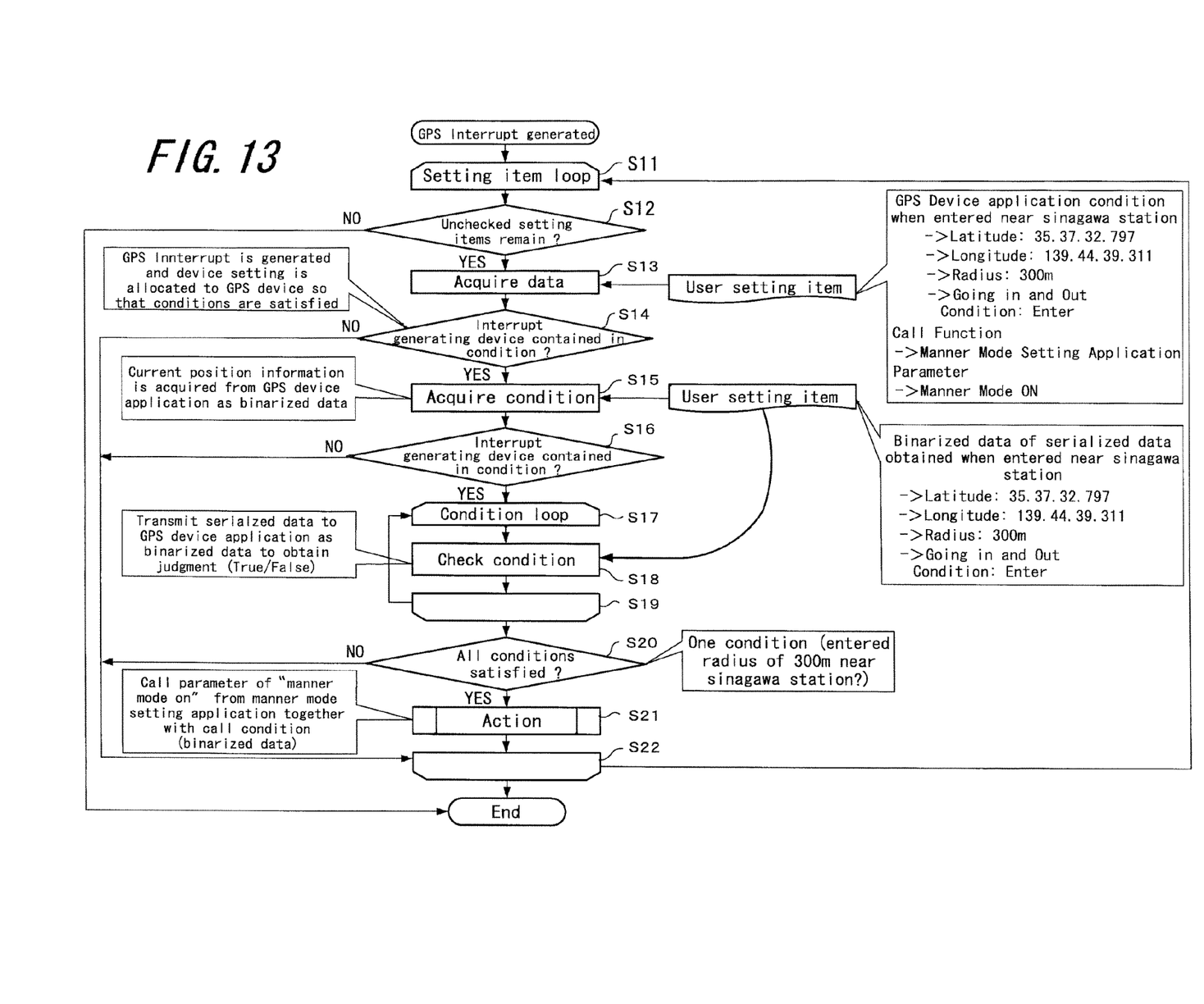
FIG. 13 is a flowchart to which reference will be made in explaining an example of how to set a manner mode according to an embodiment of the present invention.
Figure 14:
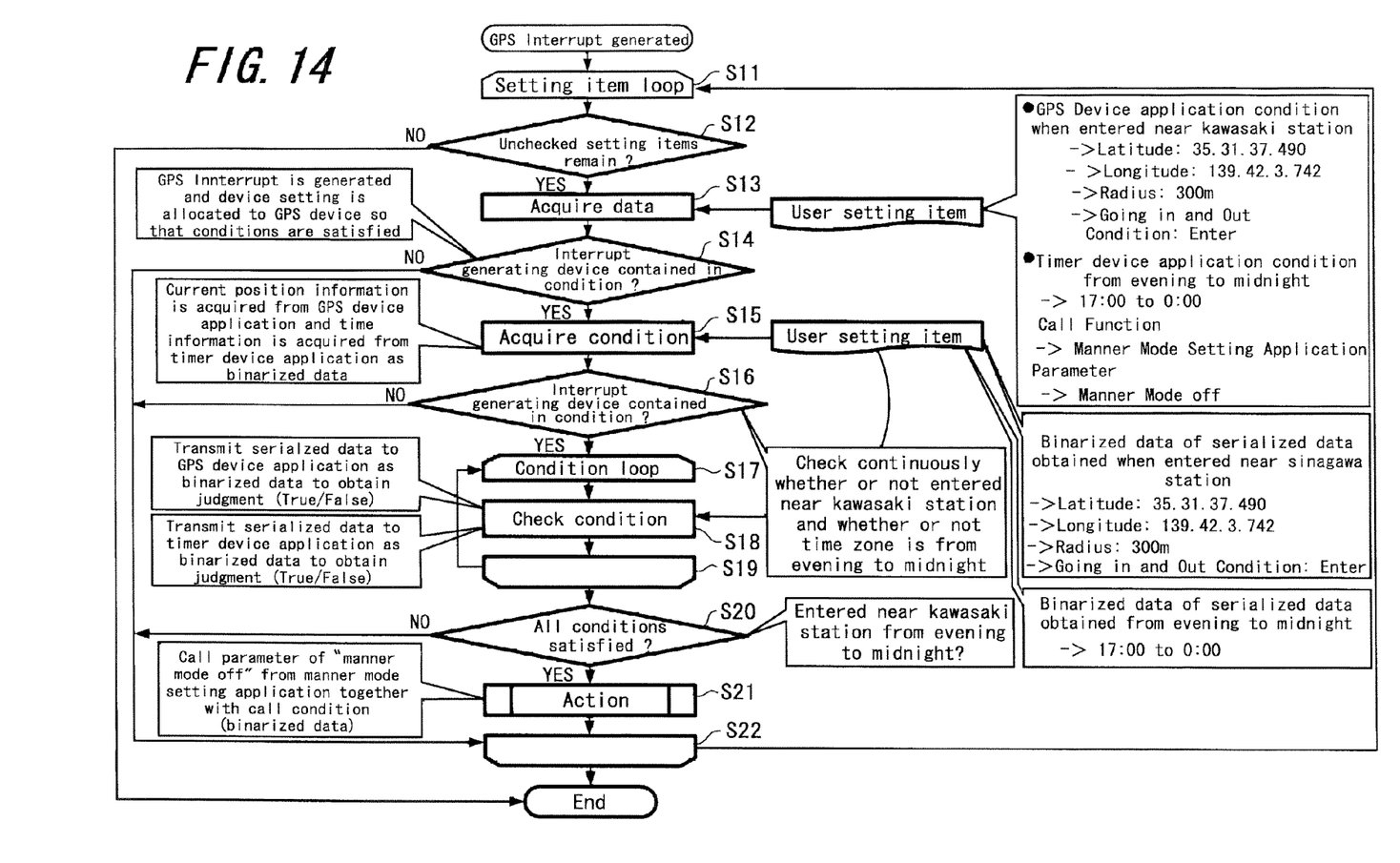
FIG. 14 is a flowchart to which reference will be made in explaining an example of how to cancel a manner mode according to an embodiment of the present invention.

Next, examples in which the processing that has been described so far is executed specifically will be described with reference to flowcharts of FIGS. 13 and 14. FIG. 13 is the flowchart to which reference will be made in explaining an example of processing to set the manner mode based on the position detected by GPS measurement. FIG. 14 is the flowchart to which reference will be made in explaining an example of processing to cancel the manner mode based on the position detected by GPS measurement. The flowcharts shown in FIGS. 13 and 14 are substantially similar to the flowchart of FIG. 6 which has already been described with respect to the operations of the broker.

An example of the processing to set the manner mode will be described with reference to FIG. 13. When data are acquired at the step S13, a manner mode setting application has functions to obtain latitude and longitude of the position and radius, going in and out conditions and data indicative of the scope in which the user enters when the user enters near the SINAGAWA STATION as GPS device application conditions and to call these conditions. A parameter is "manner mode ON". Then, it is determined at the decision step S14 whether or not these conditions are satisfied. In the next step S15, the current position information is obtained from the GPS device application as binarized data. Then, the binarized data is transmitted as serialized data and true or false of such serialized data is judged by the condition check loop at the step S18.

Then, it is determined at the decision step S20 whether or not the user enters near the SINAGAWA STATION. If such condition is satisfied as represented by a YES at the decision step S20, then control goes to the next step S21, whereat the parameter of "manner mode ON" is transmitted to the manner mode setting application so that the manner mode may be set. Once the manner mode is set, ringer tones are not emanated from the mobile phone terminal apparatus when this mobile phone terminal apparatus receives an incoming call and the mobile phone terminal apparatus automatically answers the incoming call if ringer tones are generated more than the predetermined number of ringer tones.

Next, an example of the processing to cancel the manner mode will be described with reference to the flowchart of FIG. 14. When data are acquired at the step S13, a manner mode setting application has functions to obtain latitude and longitude of the position and radius, going in and out conditions and data indicative of the scope in which the user enters when the user enters near the KAWASAKI STATION as GPS device application conditions and conditions of time from evening to midnight (for example, from 5:00 a.m. to 12. a.m.) as timer device application conditions and to call these conditions. A parameter is "manner mode OFF". Then, it is determined at the decision step S14 whether or not these conditions are satisfied. In the next step S15, the current position information is obtained from the GPS device application as binarized data. Then, the binarized data is transmitted as serialized data and true or false of such serialized data is judged by the condition check loop at the step S18.

Then, it is determined at the decision step S20 whether or not the user enters near the KAWASAKI STATION in the time zone from evening to midnight. If such condition is satisfied as represented by a YES at the decision step S20, then control goes to the next step S21, whereat the parameter of "manner mode OFF" is transmitted to the manner mode setting application so that the manner mode may be canceled. Once the manner mode setting is canceled, ringer tones are generated from the mobile phone terminal apparatus when this mobile phone terminal apparatus receives an incoming call and the mobile phone terminal apparatus is placed in the state in which it may be prohibited from automatically answering the incoming call.

In this manner, under arbitrary conditions set by the user, it becomes possible to automatically set the functions of the mobile phone terminal apparatus, such as the manner mode.

Figure 12:
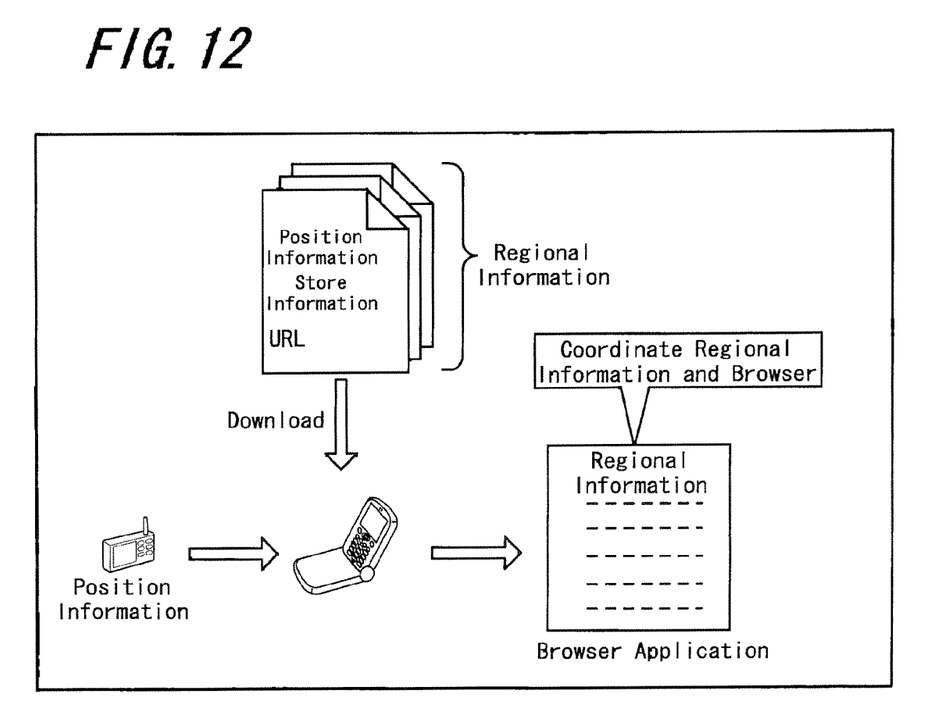
FIG. 12 is an explanatory diagram showing an example of a launcher core framework and an example of how to download regional information according to an embodiment of the present invention.

While the example of the processing to set the manner mode in response to the position measured by the GPS has been described so far in the above-mentioned embodiments of the present invention, the present invention is not limited thereto and other settings are also possible. For example, as shown in FIG. 12, regional information may be downloaded based on position information and display obtained by coordinating regional information and browsers may be made on the display unit of the mobile phone terminal apparatus.

According to the embodiments of the present invention, since the broker which judges the service definition file is provided so as to execute and control the applications, the user setting conditions can easily be added or modified by suitable processing such as addition of the service definition files. Also, the present invention becomes able to easily cope with addition of the devices that may execute processing.

In this case, since the service definition file is serialized and outputted to the application program so that the broker may become able to judge the service definition file, even when the device is added, it becomes possible for the mobile phone terminal apparatus to suitably receive a message.

Further, since the terminal control method according to the embodiments of the present invention includes a device and a plurality of device processing executed by using such device and data from the respective device processing programs are serialized and outputted, the broker becomes able to judge respective device processing with ease. Thus, even when another application is added, it becomes possible to correctly obtain a message from a new device and the present invention becomes able to easily cope with the addition of the application device.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal control method comprising:
   executing, at a device function unit, processing of a plurality of device applications, each device application corresponds to a separate function of the terminal and is configured to have its present condition transmitted to a control unit of the terminal;
   transmitting to the control unit a present condition of at least one of the plurality of device applications;
   storing at least one application program in an application program storage unit which is located separately from the control unit and the device function unit, said control unit being configured to communicate with both the device function unit and the application program storage unit;
   storing a user setting for the at least one application program in a service definition file, the user setting indicating a condition in one of the device applications for which the application program is to be executed;
   receiving at the control unit the present condition of the at least one of the plurality of device applications;
   judging whether or not the received present condition of the at least one of the plurality of device applications corresponds to the condition indicated by the user setting; and
   executing defined processing of the at least one application program if said received present condition corresponds to the condition indicated by the user setting.

2. A terminal control method according to claim 1, wherein said service definition file transmits serialized data to said at least one application program so that said control unit can judge said service definition file.

3. A terminal control method according to claim 1, wherein data from respective device applications is serialized so that said control unit can judge respective device processing.

4. A terminal control method according to claim 1, wherein the plurality of device applications include a GPS device application, a timer application, and a contact-less IC card application.

5. A terminal control method according to claim 1, wherein the storing at least one application program includes storing a plurality of application programs and the storing a user setting includes storing a separate user setting for each of the plurality of application programs.

6. A terminal apparatus comprising:
   a device function unit configured to execute processing of a plurality of device applications and transmit to a control unit of the terminal apparatus a present condition of at least one of the plurality of device applications, each device application corresponds to a separate function of the terminal apparatus and is configured to have its present condition transmitted to the control unit;
   an application program storage unit for storing at least one application program which is located separately from the control unit and the device function unit, said control unit being configured to communicate with both the device function unit and the application program storage unit;
   a service definition file storage unit for storing a user setting for the at least one application program, the user setting indicating a condition in one of the device applications for which the application program is to be executed; and
   the control unit configured to receive the present condition of the at least one of the plurality of device applications from said device function unit, judge whether or not a received present condition of the at least one of the plurality of device applications corresponds to the condition indicated by the user setting, and execute defined processing of the at least one application program if said received present condition corresponds to the condition indicated by the user setting.

7. A computer readable storage medium encoded with computer executable instructions, which when executed by a terminal, cause the terminal to perform a method comprising:
   executing, at a device function unit, processing of a plurality of device applications, each device application corresponds to a separate function of the terminal and is configured to have its present condition transmitted to a control unit of the terminal apparatus;
   transmitting to the control unit a present condition of at least one of the plurality of device applications;
   storing at least one application program in an application program storage unit which is located separately from the control unit and the device function unit, said control unit being configured to communicate with both the device function unit and the application program storage unit;
   storing a user setting for the at least one application program in a service definition file, the user setting indicating a condition in one of the device applications for which the application program is to be executed;
   receiving at the control unit the present condition of the at least one of the plurality of device applications;
   judging whether or not the received present condition of the at least one of the plurality of device applications corresponds to the condition indicated by the user setting; and
   executing defined processing of the at least one application program if said received present condition corresponds to the condition indicated by the user setting.

* * * * *